(12) United States Patent  
Salomonsson

(10) Patent No.: US 10,023,118 B2  
(45) Date of Patent: Jul. 17, 2018

(54) VEHICLE VISION SYSTEM WITH THERMAL SENSOR

(71) Applicant: MAGNA ELECTRONICS INC., Auburn Hills, MI (US)

(72) Inventor: Ove J. Salomonsson, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 135 days.

(21) Appl. No.: 15/076,915

(22) Filed: Mar. 22, 2016

(65) Prior Publication Data

US 2016/0280133 A1  Sep. 29, 2016

Related U.S. Application Data

(60) Provisional application No. 62/136,676, filed on Mar. 23, 2015.

(51) Int. Cl.

| | | |
|---|---|---|
| *B60Q 9/00* | (2006.01) | |
| *G06K 9/20* | (2006.01) | |
| *B60Q 1/24* | (2006.01) | |
| *H04N 5/225* | (2006.01) | |
| *B62D 15/02* | (2006.01) | |
| *B60T 7/22* | (2006.01) | |
| *G06K 9/00* | (2006.01) | |

(Continued)

(52) U.S. Cl.

CPC ............ *B60Q 9/008* (2013.01); *B60Q 1/085* (2013.01); *B60Q 1/245* (2013.01); *B60T 7/22* (2013.01); *B62D 15/0265* (2013.01); *G06K 9/00805* (2013.01); *G06K 9/209* (2013.01); *H04N 5/2258* (2013.01); *H04N 5/33* (2013.01); *B60Q 2300/45* (2013.01); *B60T 2201/022* (2013.01); *H04N 5/2256* (2013.01)

(58) Field of Classification Search

CPC .... B60Q 9/008; B60Q 2300/45; B60Q 1/245; B60Q 1/085; G06K 9/209; G06K 9/00805; B62D 15/0265; B60T 2201/022; B60T 7/22; H04N 5/2256; H04N 5/33; H04N 5/2258

See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Frederick M Brushaber  
(74) *Attorney, Agent, or Firm* — Honigman Miller Schwartz and Cohn, LLP

(57) ABSTRACT

A vision system for a vehicle includes a high resolution camera disposed at the vehicle windshield and having a field of view forward of the vehicle, and a low resolution sensor disposed at a forward portion of the vehicle and having a field of sensing forward of the vehicle. Responsive to processing of an output of the low resolution sensor, a control determines the presence of a hot spot forward of the vehicle. Responsive to determination of a hot spot, the control enhances processing of image data captured by the camera to determine if the hot spot is indicative of presence of a pedestrian or animal ahead of the vehicle. Responsive to determination that the hot spot is indicative of presence of a pedestrian or animal, the control generates an alert to a driver of the vehicle and/or controls a vehicle system to mitigate impact with the pedestrian or animal.

20 Claims, 1 Drawing Sheet

(51) Int. Cl.
*H04N 5/33* (2006.01)
*B60Q 1/08* (2006.01)

(56) References Cited

U.S. PATENT DOCUMENTS

| | | | |
|---|---|---|---|
| 5,949,331 | A | 9/1999 | Schofield et al. |
| 6,087,953 | A | 7/2000 | DeLine et al. |
| 6,172,613 | B1 | 1/2001 | DeLine et al. |
| 6,243,003 | B1 | 6/2001 | DeLine et al. |
| 6,250,148 | B1 | 6/2001 | Lynam |
| 6,278,377 | B1 | 8/2001 | DeLine et al. |
| 6,326,613 | B1 | 12/2001 | Heslin et al. |
| 6,420,975 | B1 | 7/2002 | DeLine et al. |
| 6,428,172 | B1 | 8/2002 | Hutzel et al. |
| 6,445,287 | B1 | 9/2002 | Schofield et al. |
| 6,485,081 | B1 | 11/2002 | Bingle et al. |
| 6,690,268 | B2 | 2/2004 | Schofield et al. |
| 6,824,281 | B2 | 11/2004 | Schofield et al. |
| 7,004,593 | B2 | 2/2006 | Weller et al. |
| 7,038,577 | B2 | 5/2006 | Pawlicki et al. |
| 7,289,037 | B2 | 10/2007 | Uken et al. |
| 7,480,149 | B2 | 1/2009 | DeWard et al. |
| 7,567,687 | B2 * | 7/2009 | Kudo .................... B60R 1/00 340/435 |
| 7,720,580 | B2 | 5/2010 | Higgins-Luthman |
| 7,855,755 | B2 | 12/2010 | Weller et al. |
| 7,914,187 | B2 | 3/2011 | Higgin-Luthman et al. |
| 8,013,780 | B2 | 9/2011 | Lynam |
| 8,256,821 | B2 | 9/2012 | Lawlor et al. |
| 8,764,256 | B2 | 7/2014 | Foote et al. |
| 9,090,213 | B2 | 7/2015 | Lawlor et al. |
| 9,380,219 | B2 | 6/2016 | Salomonsson et al. |
| 2005/0110621 | A1* | 5/2005 | Hahn .................... B60R 1/00 340/435 |
| 2005/0270784 | A1* | 12/2005 | Hahn .................... G02B 23/12 362/459 |
| 2005/0285966 | A1* | 12/2005 | Bamji .................... G01C 3/08 348/336 |
| 2006/0017656 | A1* | 1/2006 | Miyahara ............... B60R 1/00 345/8 |
| 2006/0221250 | A1* | 10/2006 | Rossbach ............... G01S 17/89 348/630 |
| 2009/0002141 | A1* | 1/2009 | Rinaldi .................. B60R 1/00 340/425.5 |
| 2010/0020170 | A1* | 1/2010 | Higgins-Luthman ...... B60Q 1/1423 348/135 |
| 2010/0289632 | A1* | 11/2010 | Seder .................... G01S 13/723 340/436 |
| 2014/0112537 | A1* | 4/2014 | Frank .................... H04N 5/33 382/103 |
| 2014/0160284 | A1 | 6/2014 | Achenbach et al. |
| 2014/0218520 | A1* | 8/2014 | Teich .................... H04N 5/2354 348/143 |
| 2015/0005982 | A1* | 1/2015 | Muthukumar ........... B60T 1/10 701/1 |
| 2015/0015713 | A1 | 1/2015 | Wang et al. |
| 2015/0124098 | A1 | 5/2015 | Winden et al. |
| 2015/0327398 | A1 | 11/2015 | Achenbach et al. |
| 2016/0119527 | A1 | 4/2016 | Shahid et al. |
| 2016/0162747 | A1 | 6/2016 | Singh et al. |
| 2017/0083774 | A1 | 3/2017 | Solar et al. |
| 2017/0113613 | A1 | 4/2017 | Van Dan Elzen et al. |
| 2017/0270375 | A1* | 9/2017 | Grauer .................. G06K 9/00805 |

* cited by examiner

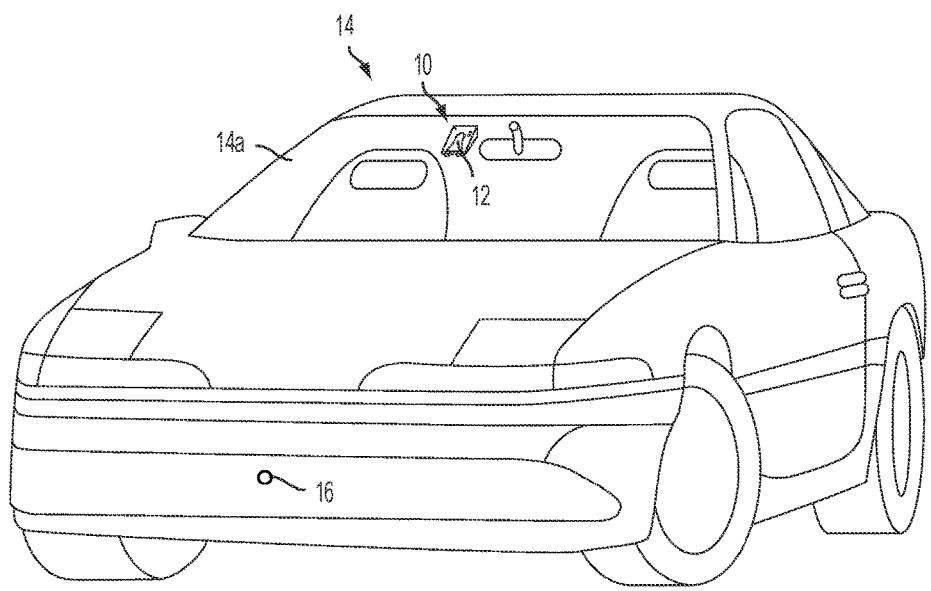

VEHICLE VISION SYSTEM WITH THERMAL SENSOR

CROSS REFERENCE TO RELATED APPLICATION

The present application claims the filing benefits of U.S. provisional application Ser. No. 62/136,676, filed Mar. 23, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides a low resolution thermal sensor that is operable to make an initial determination as to the possibility or likelihood that a pedestrian or animal is ahead of the vehicle, whereby further or enhanced image processing of image data captured by the camera can determine whether or not a pedestrian or animal is actually present ahead of the vehicle.

According to an aspect of the present invention, a vision system for a vehicle includes a camera disposed at a windshield of the vehicle and having a field of view through the windshield and forward of the vehicle. The camera comprises a high resolution pixelated imaging array having a plurality of photosensing elements (such as at least about 300,000 photosensing elements or at least about 500,000 photosensing elements and preferably at least about one million or more photosensing elements, optionally with color sensing or spectral filtering so that high resolution color images may be captured by the camera). A low resolution long range and low light sensor (such as a low resolution thermal sensor, such as a thermal sensor array having less than about 480 thermal sensing elements or pixels, or less than about 240 thermal sensing elements or pixels or less than about 100 thermal sensing elements or pixels) is disposed at a forward portion of the vehicle and has a field of sensing forward of the vehicle. Responsive to processing of an output of the low resolution long range and low light sensor, a control determines the presence of a hot spot forward of the vehicle, and, responsive to determination of a hot spot, the control enhances image processing of image data captured by the camera to determine if the determined hot spot is indicative of a pedestrian or animal. The enhancement of the image processing may be achieved by directing enhanced illumination towards the determined hot spot such that image processing of captured image data is more effective in determining the presence of an object or pedestrian or animal at the illuminated area or region. Responsive to determination that the determined hot spot is indicative of a pedestrian or animal, the control at least one of (i) generates an alert to the driver of the vehicle and (ii) controls a system of the vehicle to limit or avoid impact with the determined pedestrian or animal.

These and other objects, advantages, purposes and features of the present invention will become apparent upon review of the following specification in conjunction with the drawings.

BRIEF DESCRIPTION OF THE DRAWINGS

FIG. 1 is a perspective view of a vehicle with a vision system that incorporates a camera and low resolution thermal sensor in accordance with the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Referring now to the drawings and the illustrative embodiments depicted therein, a vehicular camera system or vision system 10 has a forward viewing camera 12 that can be installed on the inside of the front windshield 14a of a vehicle 14, such as a car, truck, bus, or van (FIG. 1). Such a camera system may be used for a variety of functions such as object detection, lane keeping, and high beam control. As shown in FIG. 1, the vehicular camera system or module is configured to be attached in a front-facing manner to the vehicle 14 so as to have a field of view through the windshield and forward of the vehicle. The vision system 10 includes or is associated with a low resolution thermal sensor 16, which is disposed at a forward portion of the vehicle, such as at the vehicle bumper or the like) and views forwardly of the vehicle to determine the presence of "hot spots" ahead of the vehicle. The vision system includes a control having a processor that processes an output of the low resolution thermal sensor to determine if there are hot spots ahead of the vehicle that may be indicative of a pedestrian or animal ahead of the vehicle. Responsive to a determination of such a hot spot, the system may control a forward facing light of the vehicle (such as a headlight or spot light of the vehicle) to illuminate the determined hot spot area, whereby the processor processes image data captured by the forward viewing (higher resolution) camera 10 (such as a black and white camera or monochrome camera or a color camera) to determine if the detected hot spot is indicative of a pedestrian or animal or the like ahead of the vehicle. Responsive to such a determination, the system may generate an alert to the driver (such as a visual or audible alert or haptic alert or the like) or may control a braking system or steering system of the vehicle to avoid impact with the determined pedestrian or animal.

Optionally, the camera may be associated with a multi-camera vision system of the vehicle, and the forward viewing camera and multiple exterior viewing cameras (such as a rearwardly facing camera at the rear of the vehicle, and a sidewardly/rearwardly facing camera at respective sides of the vehicle) may capture image data of the regions exterior of the vehicle, with the camera having a lens for focusing images at or onto an imaging array or imaging plane or imager of the camera. The vision system includes a control or electronic control unit (ECU) or processor that is operable to process image data captured by the cameras and may provide displayed images at a display device for viewing by the driver of the vehicle. The data transfer or signal communication from the camera to the ECU may comprise any suitable data or communication link, such as a vehicle network bus or the like of the equipped vehicle.

In some applications of vehicle vision systems, such as for pedestrian detection or the like, it may be desirable to include a high resolution thermal imager to provide enhanced night vision detection of pedestrians and animals. Such "Focus Beam" systems typically are very costly since they use high resolution thermal imagers for the whole night vision detection of pedestrians and animals.

The vision system of the present invention uses the longer range of a low resolution thermal sensor 16 to find the suspected "hot spots" (regions in the field of view of the sensor where there is a determined concentrated area or object that has an elevated temperature above a threshold level) that can potentially be pedestrians or animals and then directs "spotlighting head-lights" towards the determined hotspot and uses a standard high resolution CMOS imager to detect the full characteristics of the actual object. Optionally, a "hot spot" may include regions in the field of view of the sensor where there is Lidar or Radar echo, Flash Ladar time of flight (TOF) image slice or short wave infrared (SWIR) night sky glare on an object or the like. The hot spot thus is determined by detecting a region within the field of sensing of the low resolution sensor where there exists a concentration of electromagnetic radiation above a threshold level. For example, the low resolution sensor may determine a hot spot where it senses a region where a light level or heat level or infrared radiation level is above a threshold level.

Thermal sensors (typically bolometer based) are inherently very costly, but costs come down significantly with lower resolution (such as, for example, a thermal sensor having a sensing array of only about 80×30 pixels or thereabouts) since the yield goes up exponentially and the amount of Silicon for the read out circuits and expensive materials and the related processing of the thermal sensors is reduced (more dies per wafer). Additionally, the expensive optics (usually Germanium lenses) are reduced in size (due to the smaller low resolution sensing array) and with that the costs and mounting space requirements are also reduced.

Also, because thermal sensors have to be mounted in the front area (such as the bumper) of the vehicle (such thermal sensors cannot sense through the glass windshield), they are likely to have to be replaced, at high cost for the owner/insurance company, for even small frontal accidents or impacts.

The thermal sensor of the vision system of the present invention comprises a low resolution sensor having a low resolution array of pixels (such as less than or equal to about 480 pixels, or less than or equal to about 240 pixels or thereabouts or less than or equal to about 100 pixels or thereabouts). The thermal sensor is sensitive to far infrared (FIR) wavelengths, such as between about 6 and 12 microns.

In order to positively and reliably detect, for example, a pedestrian, it is useful to have about 10 to 20 pixels (such as a sub-array of about 4×4 pixels or the like) of the sensor viewing or having the field of view on the object. In order to do this at a distance further ahead of the vehicle than is illuminated by the low beam lighting of the vehicle, such as greater than about 60 meters or thereabouts, a fairly high resolution is needed from the thermal imaging system, and this is what is so cost prohibitive.

By limiting the detection (by the low resolution thermal sensor) to just a "hotspot" without further detection or determination of the object, only a few pixels will be necessary to make the initial determination. Once the hot spot has been identified, a visible light (or near infrared (NIR) or infrared (IR) light) focused light beam is targeted at the hot spot (or general region where the hot spot is detected) for further or enhanced image processing of image data captured by the forward viewing higher resolution camera for further characterization of the type of object and possibly its predicted path (and likelihood that the object may become a danger to the driven vehicle or may become endangered by the driven vehicle).

The system may then generate a warning (audio/visual/haptic) depending on the outcome of the detection and determination of the object and the predicted path of the vehicle and the determined object.

The present invention thus provides a vehicle vision system having a forward viewing camera (such as at the windshield of the vehicle) and a low resolution thermal sensor (such as at the vehicle bumper or the like). The system processes outputs of the low resolution thermal sensor to determine hot spots ahead of the vehicle and, responsive to such a hot spot being determined, controls a light of the vehicle to direct illumination towards the determined hot spot area, whereby processing of image data captured by the higher resolution forward viewing camera further determines what the determined hot spot is and whether or not its presence is a hazardous condition. For example, the system may control the vehicle headlights to direct greater illumination towards the determined hot spot area, such as by switching the headlights to a high beam mode or by controlling a direction of the principal axis of the beams of light emitted by the headlights. When sufficient illumination is at the determined hot spot area, image processing of image data captured by the higher resolution forward viewing camera further determines or characterizes or identifies the hot spot area to determine if it is representative of a pedestrian or animal or the like that may be in or moving into the path of the vehicle.

Optionally, the low resolution sensor may comprise a sensor that operates or is sensitive in the short wave infrared (SWIR) spectrum range (such as between about 1 and 1.8 micron wavelength), and thus can pick up useful night glare from the sky to determine the presence of objects before a CMOS camera can detect the objects. Optionally, the low resolution sensor may comprise a sensor that is sensitive in the mid-infrared (MIR) spectral band or wavelengths (such as between about 2 and 6 microns wavelength).

The low resolution sensor may also comprise different sensor technology (more expensive per pixel/data point), such as, for example, a FLASH Ladar or Lidar or the like. The system of the present invention may apply the same principle for a low quality low resolution Radar (such as to provide early detection of "hotspots") that could include vulnerable road users and animals (VRUs). This would also mean that the "low resolution, but long range and low light" complementary sensor system does not always have to be installed outside the cabin of the vehicle. Such exterior positioning of the complementary sensor is only necessary for the FIR thermal sensor, which cannot sense through the windshield. For the other optional types of low resolution, long range and low light sensors, the sensors may be disposed inside the vehicle cabin (so as to sense through the windshield of the vehicle and forward of the vehicle) or outside of the vehicle cabin (such as at a forward portion of the vehicle).

The system may utilize aspects of the vision systems described in U.S. patent application Ser. No. 14/919,189, filed Oct. 21, 2015, and/or U.S. Pat. Nos. 8,764,256; 8,013,780; 7,914,187; 7,720,580 and/or 6,485,081, and/or U.S. Publication No. US-2010-0020170, which are hereby incorporated herein by reference in their entireties. The camera or image sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. Preferably, the forward viewing camera comprises a high resolution camera having at least about 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. Nos. 6,690,268 and/or 9,264,672, which are hereby incorporated herein by reference in their entireties. The video mirror display may comprise any suitable devices and systems and optionally may utilize aspects of the display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
 a high resolution camera disposed at a windshield of a vehicle and having a field of view through the windshield and forward of the vehicle;
 wherein said camera comprises an imaging array having a plurality of photosensing elements, said plurality of photosensing elements comprising at least 1,000,000 photosensing elements;
 a low resolution sensor disposed at a forward portion of the vehicle and having a field of sensing forward of the vehicle, said low resolution sensor comprising a plurality of sensing elements, said plurality of sensing elements comprising less than 240,000 sensing elements;
 a control;
 wherein, responsive to processing of an output of said low resolution sensor, said control determines the presence of a hot spot forward of the vehicle, wherein the hot spot comprises a region within the field of sensing of said low resolution sensor where there exists a concentration of electromagnetic radiation above a threshold level;
 wherein, responsive to determination of a hot spot, said control enhances image processing of image data captured by said camera to determine if the determined hot spot is indicative of presence of a pedestrian or animal ahead of the vehicle; and
 wherein, responsive to determination, via enhanced image processing of image data captured by said camera, that the determined hot spot is indicative of presence of a pedestrian or animal ahead of the vehicle, said control at least one of (i) generates an alert to a driver of the vehicle and (ii) controls a system of the vehicle to mitigate impact with the pedestrian or animal.

2. The vision system of claim 1, wherein said low resolution sensor comprises a low resolution thermal sensor.

3. The vision system of claim 2, wherein said low resolution thermal sensor comprises a sensing array having a plurality of thermal sensing elements, said plurality of thermal sensing elements comprising less than 480 thermal sensing elements.

4. The vision system of claim 3, wherein said plurality of thermal sensing elements comprises less than 240 thermal sensing elements.

5. The vision system of claim 3, wherein said low resolution thermal sensor comprises a bolometer sensor.

6. The vision system of claim 2, wherein said control determines the presence of a hot spot forward of the vehicle by determining a region in the field of sensing of said low resolution thermal sensor that has a temperature above a threshold temperature.

7. The vision system of claim 1, wherein said control enhances image processing of captured image data by directing illumination towards the determined hot spot.

8. The vision system of claim 7, wherein said control directs illumination towards the determined hot spot by adjusting a headlight of the vehicle.

9. The vision system of claim 1, wherein, responsive to determination, via processing of image data captured by said camera, that the determined hot spot is indicative of presence of a pedestrian or animal ahead of the vehicle, said control generates an alert to the driver of the vehicle.

10. The vision system of claim 1, wherein, responsive to determination, via processing of image data captured by said camera, that the determined hot spot is indicative of presence of a pedestrian or animal ahead of the vehicle, said control controls a system of the vehicle to mitigate impact with the pedestrian or animal.

11. The vision system of claim 10, wherein, responsive to determination, via processing of image data captured by said camera, that the determined hot spot is indicative of presence of a pedestrian or animal ahead of the vehicle, said control controls at least one of a brake system of the vehicle and a steering system of the vehicle.

12. A vision system for a vehicle, said vision system comprising:
 a high resolution camera disposed at a windshield of a vehicle and having a field of view through the windshield and forward of the vehicle;
 wherein said camera comprises an imaging array having a plurality of photosensing elements, said plurality of photosensing elements comprising at least 1,000,000 photosensing elements;
 a low resolution thermal sensor disposed at a forward portion of the vehicle and having a field of sensing forward of the vehicle, said low resolution thermal sensor comprising a sensing array having a plurality of sensing elements, said plurality of sensing elements comprising less than 100,000 sensing elements;

a control;

wherein, responsive to processing of an output of said low resolution thermal sensor, said control determines the presence of a hot spot forward of the vehicle, wherein the hot spot comprises a region within the field of sensing of said low resolution thermal sensor where there exists a concentration of heat above a threshold level;

wherein, responsive to determination of a hot spot, said control enhances image processing of image data captured by said camera to determine if the determined hot spot is indicative of presence of a pedestrian or animal ahead of the vehicle; and wherein, responsive to determination, via enhanced image processing of image data captured by said camera, that the determined hot spot is indicative of presence of a pedestrian or animal ahead of the vehicle, said control at least one of (i) generates an alert to a driver of the vehicle and (ii) controls a system of the vehicle to mitigate impact with the determined pedestrian or animal.

13. The vision system of claim 12, wherein said plurality of sensing elements of said low resolution thermal sensor comprises less than 240 sensing elements.

14. The vision system of claim 12, wherein said low resolution thermal sensor comprises a bolometer sensor.

15. The vision system of claim 12, wherein said control enhances image processing of captured image data by directing illumination towards the determined hot spot.

16. The vision system of claim 15, wherein said control directs illumination towards the determined hot spot by adjusting a headlight of the vehicle.

17. The vision system of claim 12, wherein, responsive to determination, via processing of image data captured by said camera, that the determined hot spot is indicative of presence of a pedestrian or animal ahead of the vehicle, said control generates an alert to the driver of the vehicle.

18. The vision system of claim 12, wherein, responsive to determination, via processing of image data captured by said camera, that the determined hot spot is indicative of presence of a pedestrian or animal ahead of the vehicle, said control controls at least one of a brake system of the vehicle and a steering system of the vehicle to mitigate impact with the pedestrian or animal.

19. A vision system for a vehicle, said vision system comprising:

a high resolution camera disposed at a windshield of a vehicle and having a field of view through the windshield and forward of the vehicle;

wherein said camera comprises an imaging array having a plurality of photosensing elements, said plurality of photosensing elements comprising at least 1,000,000 photosensing elements;

a low resolution thermal sensor disposed at a forward portion of the vehicle and having a field of sensing forward of the vehicle, said low resolution thermal sensor comprising a sensing array having a plurality of sensing elements, said plurality of sensing elements comprising less than 240 sensing elements;

wherein said low resolution thermal sensor comprises a bolometer sensor;

a control;

wherein, responsive to processing of an output of said low resolution thermal sensor, said control determines the presence of a hot spot forward of the vehicle, wherein the hot spot comprises a region within the field of sensing of said low resolution thermal sensor where there exists a concentration of heat above a threshold level;

wherein, responsive to determination of a hot spot, said control enhances image processing of image data captured by said camera to determine if the determined hot spot is indicative of presence of a pedestrian or animal ahead of the vehicle;

wherein said control enhances image processing of captured image data by directing illumination towards the determined hot spot; and wherein, responsive to determination, via enhanced image processing of image data captured by said camera, that the determined hot spot is indicative of presence of a pedestrian or animal ahead of the vehicle, said control at least one of (i) generates an alert to a driver of the vehicle and (ii) controls a system of the vehicle to mitigate impact with the pedestrian or animal.

20. The vision system of claim 19, wherein said control directs illumination towards the determined hot spot by adjusting a headlight of the vehicle.

* * * * *